United States Patent [19]

Bullerman et al.

[11] Patent Number: 4,832,538

[45] Date of Patent: May 23, 1989

[54] FEED SPREADER

[76] Inventors: Steve Bullerman, RR 3, Box 43; Rick Bullerman, RR 3, Box 48, both of Adrian, Minn. 56110

[21] Appl. No.: 130,202

[22] Filed: Dec. 8, 1987

[51] Int. Cl.[4] .................. B65G 53/14; B65G 53/40
[52] U.S. Cl. ................................ 406/98; 406/100; 406/153; 406/166
[58] Field of Search .................... 406/96–105, 406/38, 51, 52, 71, 151–153, 113, 154, 164–166; 239/654, 280, 280.5, 273, DIG. 8; 108/9, 139, 150; 248/278, 231.7, 219.2

[56] References Cited

U.S. PATENT DOCUMENTS

| 368,242 | 8/1887 | Romweber | 406/96 |
|---|---|---|---|
| 592,672 | 10/1897 | Toner et al. | 406/102 |
| 777,897 | 12/1904 | Heyward | 406/96 |
| 843,806 | 2/1907 | Groves | 406/98 |
| 870,822 | 11/1907 | Halvorson | 406/164 X |
| 884,016 | 4/1908 | Groves | 406/98 |
| 955,358 | 4/1910 | Rosenthal | 406/96 |
| 1,155,684 | 10/1915 | Rexroat | 406/96 |
| 1,855,964 | 4/1932 | Higginbotham | 248/297 X |
| 2,362,422 | 11/1944 | Wall | 406/98 |
| 2,522,296 | 9/1950 | Overstedt | 108/9 |
| 2,587,965 | 3/1952 | Campbell | 239/280.5 |
| 2,858,625 | 11/1958 | Rivinius | 406/100 X |
| 2,946,629 | 7/1960 | Headley | 406/96 X |
| 3,015,188 | 1/1962 | Reinecker et al. | 239/654 X |
| 3,250,574 | 5/1966 | Huhn | 406/96 X |
| 4,409,746 | 10/1983 | Beck | 406/96 |
| 4,697,772 | 10/1987 | Kosugi et al. | 248/278 X |

FOREIGN PATENT DOCUMENTS

| 172754 | 10/1952 | Austria | 406/102 |
|---|---|---|---|
| 3015824 | 11/1980 | Fed. Rep. of Germany | 406/103 |
| 3039918 | 5/1982 | Fed. Rep. of Germany | . |
| 145025 | 11/1981 | Japan | . |
| 57-57122 | 4/1982 | Japan | . |
| 10884 | of 1887 | United Kingdom | 248/231.7 |

Primary Examiner—Sherman D. Basinger
Assistant Examiner—James M. Kannofsky
Attorney, Agent, or Firm—Jerry T. Kearns

[57] ABSTRACT

A feed spreader has an impeller for distributing feed to livestock in a feed lot. The impeller is driven through a belt and pulley arrangement by an electric motor. The feed spreader has a connection for receiving feed from a feed hopper through a flexible tube attached to the auger of the feed hopper. The feed spreader has an adjustable mount for positioning the feed spreader on a fence post of the feed lot. In this manner, feed can be distributed to livestock within the feed lot without necessitating the entry of any personnel into the feed lot.

4 Claims, 3 Drawing Sheets

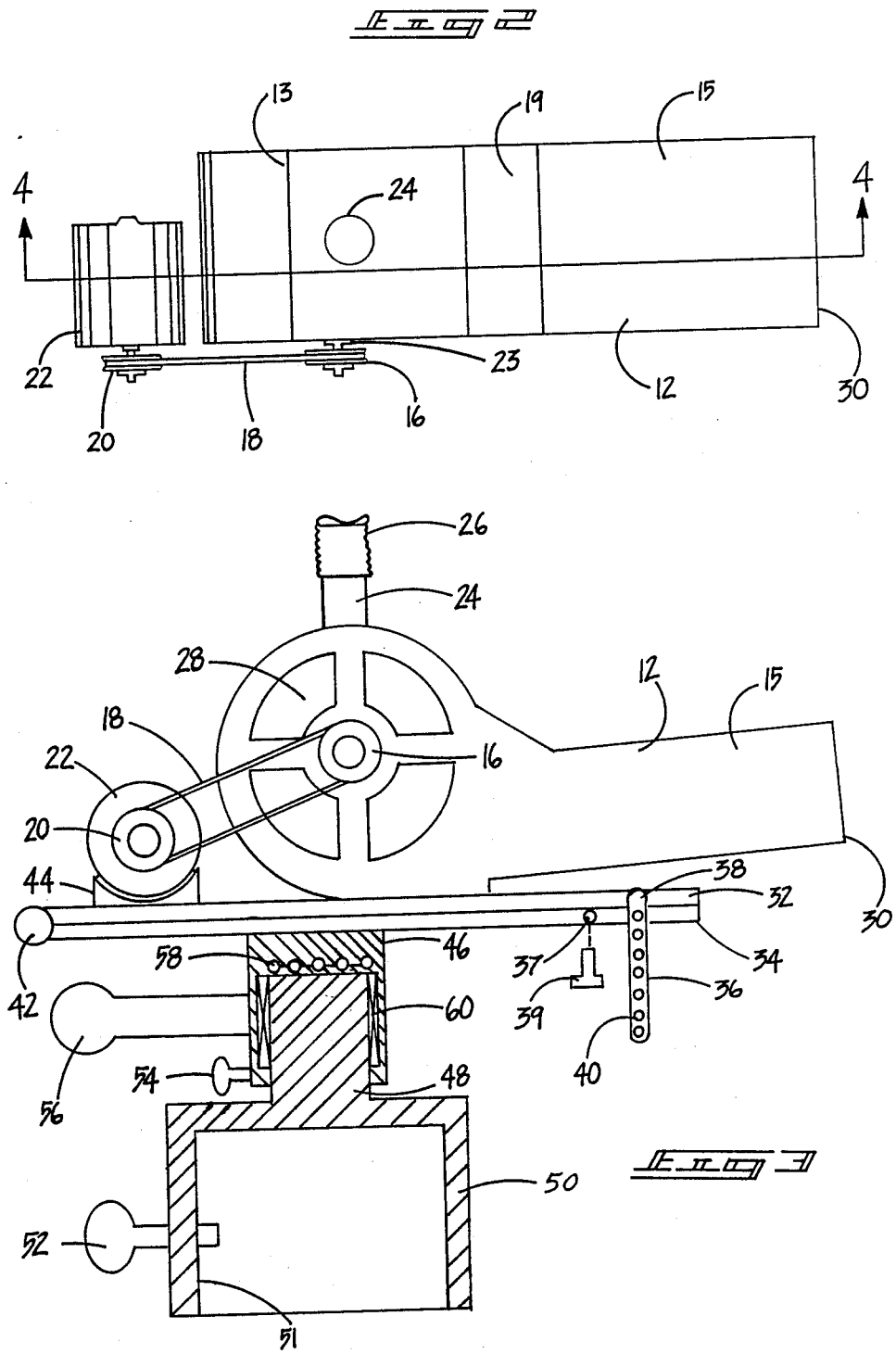

FEED SPREADER

BACKGROUND OF THE INVENTION

1. Field of the Invention

The present invention relates to feed spreaders, and more particularly pertains to a new and improved feed spreader which utilizes a motor driven impeller for distributing feed from the auger of a feed hopper. Small feed lot operations are currently operated by individuals who must carry feed into the lot. Especially in feed lots stocked with hogs and sows, a person carrying feed into the feed lot is subjected to danger from the excited animals. Many individuals have been trampled and seriously injured by stampeding livestock within feed lots. While larger feed lots utilize expensive conveying systems for distributing feed within the feed lot, the smaller feed lot operator cannot afford these expensive measures. In order to solve this problem, the present invention provides an inexpensive feed spreader for attachment to the auger of conventional feed bins.

2. Description of the Prior Art

Various types of feed spreaders and feed loaders are known in the prior art. A typical example of such a feed loader is to be found in U.S. Pat. No. 368,242, which issued to G. Romweber on Aug. 16, 1887. This patent discloses the use of reciprocating piston type air pumps for transferring grain in a grain elevator. U.S. Pat. No. 777,897, which issued to B. Heyward on Dec. 20, 1904, discloses a suction device connected to a flexible hose for use in harvesting cotton. U.S. Pat. No. 955,358, which issued to A. Rosenthal on Apr. 19, 1910, discloses a pneumatic straw stacker and elevator. A fan is utilized to draw straw into an intake spout and mechanical reciprocating bars are utilized to move the straw through a discharge spout. U.S. Pat. No. 4,409,746, which issued to J. Beck on Oct. 18, 1983, discloses a dredging device which utilizes a cylindrical chamber with a tangentially directed high pressure fluid stream for creating an aspirated suction effect to an inlet spout disposed adjacent the bottom of a body of water. U.S. Pat. No. 1,155,684, which issued to G. Rexroat on Oct. 5, 1915, discloses a device for feeding coal to a fire box. This device utilizes a rotatable impeller for moving coal through a discharge chute.

While the above mentioned devices are suited for their intended usage, none of these devices provide a feed spreader which utilizes a motor driven impeller in conjunction with an adjustable mounting arrangement for mounting the feed spreader on a fence post of a feed lot. Additionally, none of aforementioned patents disclose a feed spreader which encloses a rotary impeller within a cylindrical chamber having an inlet opening in a cylindrical side wall and an elongated discharge spout. Inasmuch as the art is relatively crowded with respect to these various types of feed spreaders, it can be appreciated that there is a continuing need for and interest in improvements to such feed spreaders, and in this respect, the present invention addresses this need and interest.

SUMMARY OF THE INVENTION

In view of the foregoing disadvantages inherent in the known types of feed spreaders now present in the prior art, the present invention provides an improved feed spreader. As such, the general purpose of the present invention, which will be described subsequently in greater detail, is to provide a new and improved feed spreader which has all the advantages of the prior art feed spreaders and none of the disadvantages.

To attain this, a representative embodiment of the concepts of the present invention is illustrated in the drawings and makes use of a generally cylindrical casing having a rotationally mounted rotor centrally disposed therein. An elongated discharge chute is connected tangentially to the cylindrical impeller casing. The impeller is rotated by an electric motor through a belt and pulley arrangement. A feed inlet tube for connection to an auger of a feed bin is disposed in the cylindrical side wall of the impeller casing. The feed spreader is provided with an adjustable mounting arrangement for controlling the inclination of the discharge spout and for rotating the discharge spout from side to side. The mounting arrangement is adapted for attachment to a fence post of a feed lot.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved feed spreader which has all the advantages of the prior art feed spreaders and none of the disadvantages.

It is another object of the present invention to provide a new and improved feed spreader which may be easily and efficiently manufactured and marketed.

It is a further object of the present invention to provide a new and improved feed spreader which is of a durable and reliable construction.

An even further object of the present invention is to provide a new and improved feed spreader which is susceptible of a low cost of manufacture with regard to both materials and labor, and which accordingly is then susceptible of low prices of sale to the consuming public, thereby making such feed spreaders economically available to the buying public.

Still yet another object of the present invention is to provide a new and improved feed spreader which provides in the apparatuses and methods of the prior art some of the advantages thereof, while simultaneously overcoming some of the disadvantages normally associated therewith.

Still another object of the present invention is to provide a new and improved feed spreader which provides an inexpensive device for distributing feed within a feed lot without necessitating the entry of any personnel into the feed lot.

Yet another object of the present invention is to provide a new and improved feed spreader which utilizes an electric motor driven rotary impeller for distributing feed from the auger of a feed bin through an adjustably mounted discharge spout into a feed lot.

Even still another object of the present invention is to provide a new and improved feed spreader which has a discharge spout mounted for elevational adjustment and which may be rotated from side to side and mounted on a fence post of a feed lot.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a top view of the feed spreader of the present invention.

FIG. 3 is a side view, partially in cross section, illustrating the feed spreader of the present invention disposed on the adjustable mounting bracket of the present invention.

DESCRIPTION OF THE PREFERRED EMBODIMENT

Figure 1:
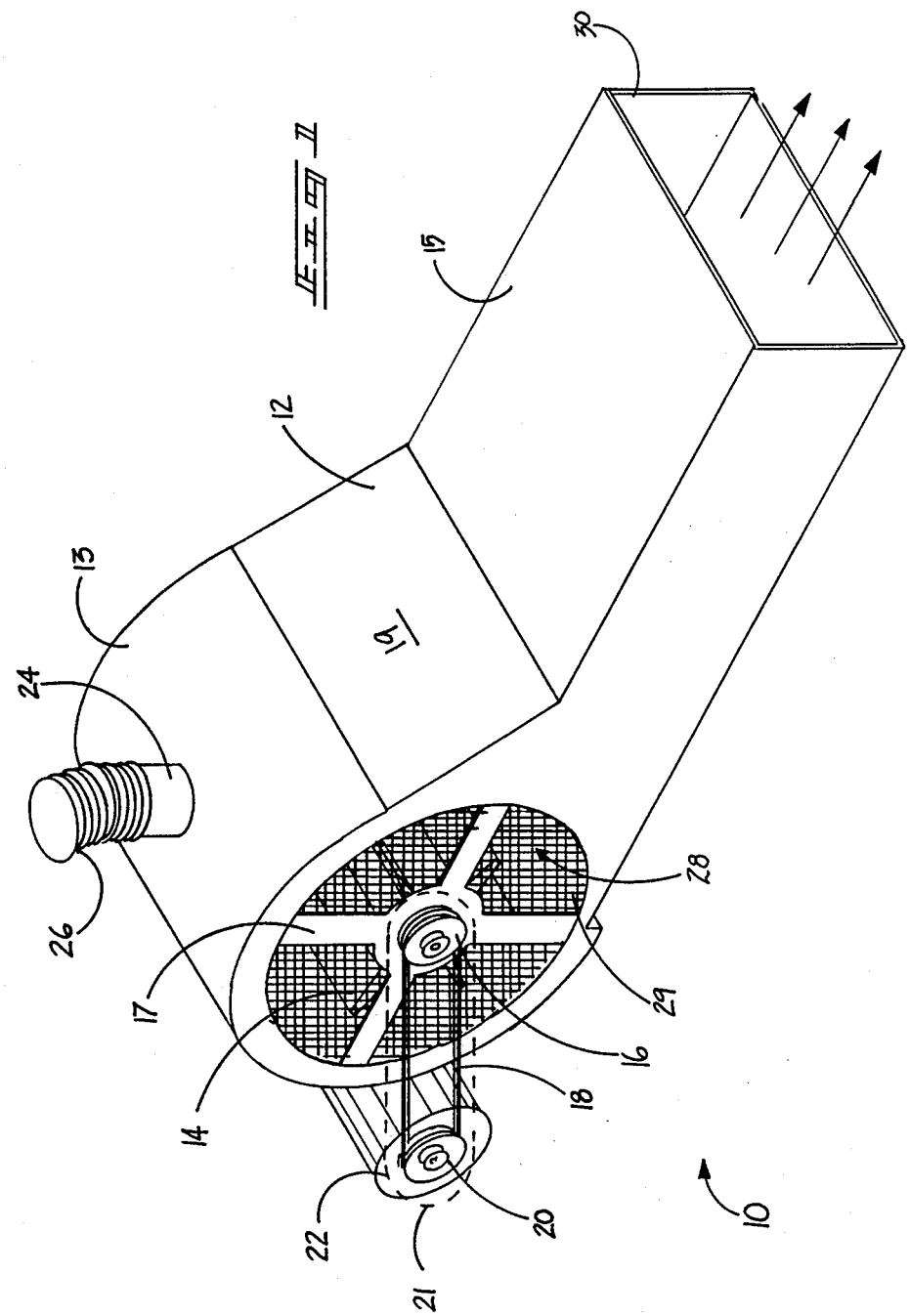
FIG. 1 is a perspective view of the feed spreader of the present invention.

With reference now to the drawings, and in particular to FIG. 1 thereof, a new and improved feed spreader embodying the principles and concepts of the present invention and generally designated by the reference numeral 10 will be described.

More specifically, it will be noted that the first embodiment 10 of the invention includes a hollow casing 12. The hollow casing 12 has a cylindrical portion 13 which receives a rotary impeller 14. The cylindrical portion 13 has a circular central opening across which extends for support struts 17. The impeller 14 is mounted for rotation by conventional bearings 23 (FIG. 2) supported by the support struts 17. A pulley 16 is connected for rotation with the impeller 14. A second pulley 20 is mounted on the output shaft of an electric motor 22 and serves to rotate the impeller pulley 16 via a belt 18. A solid safety shield 21, illustrated in dotted lines for purposes of clarity, covers the moving drive belt 18 and pulleys 16 and 20. The hollow casing 12 has a generally rectangular hollow discharge spout 15 which is connected to the cylindrical portion 13 by an inclined transitional wall 19. This transitional wall 19 serves to direct grain driven by the impeller 14 to the discharge chute 15. An intake spout 24 extends through the cylindrical side wall of the cylindrical housing portion 13. The flexible hose 26 connected to the auger of a conventional feed bin is shown connected to the intake spout 24. Incoming feed or grain from the flexible tube 26 is introduced through the spout 24 into the interior of the hollow cylindrical casing portion 13. The rotary impeller 14 intermixes the incoming grain with an air stream admitted through side openings 28. A safety screen 29 covers the side openings 28, to protect the operator and to prevent foreign material from being drawn into the air stream. The grain is now entrained in a rapidly moving air stream and is conducted through the outlet opening 30 in the discharge spout 15. Due to the rapid velocity of the air and grain stream, the grain may be directed as desired within the interior of a feed lot.

With reference now to FIG. 2, a top view of the feed spreader 10 of the present invention is provided.

With reference now to FIG. 3, a side view illustrating the feed spreader 10 of the present invention mounted on an adjustable mounting bracket is provided. The hollow feed spreader casing 12 and electric motor 22 are secured by conventional bolts to an adjustable elevation plate 32. The electric motor 22 is secured within a motor supporting cradle 44. The elevational plate 32 is pivotally connected by a hinge 42 to a stationary mounting plate 34. A link 36 is connected by a pivot pin 38 to the elevation plate 32. The link 36 is provided with an array of spaced holes 40. By lifting the elevational plate 32 upwardly away from the stationary plate 34, the discharge opening 30 may be positioned at a variety of different angles, thus controlling the discharge feed stream. It is contemplated that a pin 39 will be inserted through one of the spaced holes 40 into a corresponding hole 37 on the stationary plate 34, thus securing the plate 32 at the desired inclination. It is contemplated that an elongated slot may be substituted for the spaced holes 40, without departing from the scope of the present invention. A rotary collar 46 is securely fastened to the stationary plate 34. The collar 46 has a hollow cylindrical recess provided with a thrust bearing 58 and rotary bearing 60 for supporting an axle 48 of a mounting adaptor 50. The mounting adaptor 50 has a hollow central recess for receiving a fence post of a feed lot. The hollow central recess may be cylindrical, square, hexagonal or a variety of other shapes for engagement with variously configured fence posts. A set screw 52 is provided for engagement with the side of a fence post. A second set screw 54 is provided through the collar 46 for engagement with the axle 48. This serves to secure the collar 46 at an adjusted rotational position with respect to the mounting adaptor 50. A handle 56 is secured to the collar 46 to assist an operator in rotating the collar 46 about the axle 48. In this fashion, the discharge chute opening 30 may be swung laterally from side to side about the central axis of the axle 48.

Figure 4:
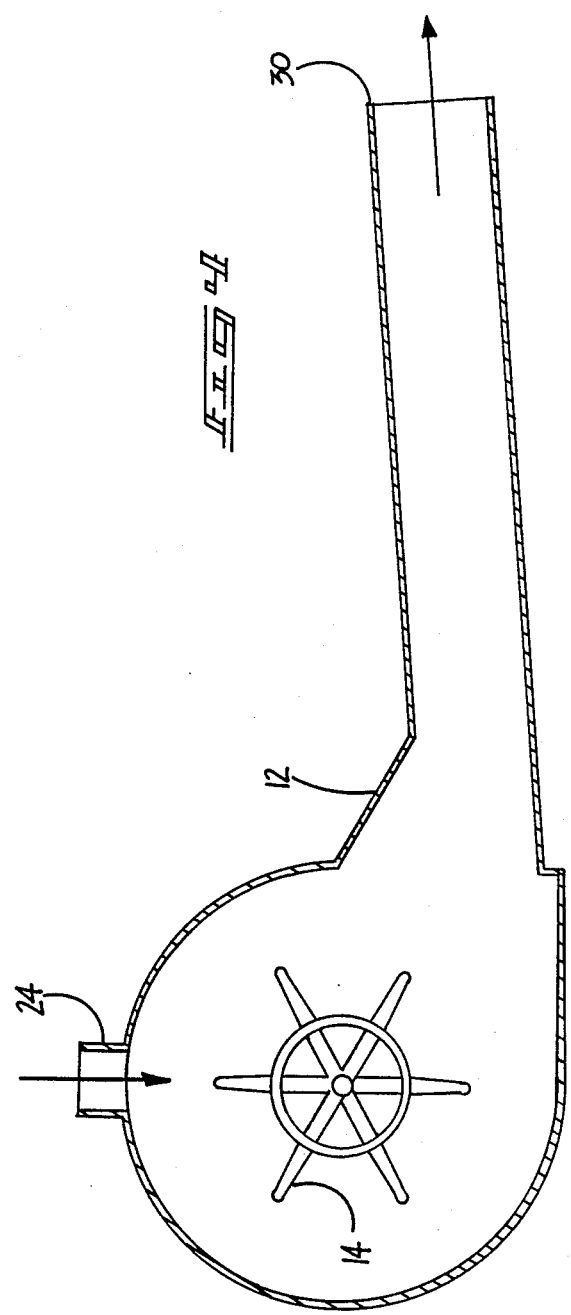
FIG. 4 is a cross sectional view taken along line 4—4 of FIG. 2, illustrating the interior of the feed spreader of the present invention.

With reference now to FIG. 4, the cross sectional configuration of the impeller 14 may now be understood. Grain or feed is introduced through the inlet opening 24 and entrained in an air stream and discharged through the opening 30.

With reference now to FIG. 3, the manner of usage of the feed spreader 10 of the present invention will now be described. The feed spreader 10 and a hollow portion 51 of attached mounting adaptor 50 are first inserted over a fence post of a feed lot fence. Set screw 52 is then tightened to secure the mounting adaptor 50 to the fence post. A flexible tube 26 connected to the auger of a conventional feed bin is then coupled to the intake opening 24. The elevational plate 32 is then pivoted about hinge 42, until the discharge spout 15 is positioned at the desired inclination. A pin is then inserted through one of the spaced holes 40 in the link 36 into engagement with a hole in the stationary plate 34. The electric motor 22 and feed bin auger drive are then set into operation. Grain is delivered through the flexible tube 26 into the interior of the cylindrical casing 13 and entrained within an air stream 28 by the impeller 14. The high velocity grain and air stream is then discharged through an opening 30 in the discharge chute 15. By manipulation of the handle 56, an operator may swing the discharge chute 15 laterally from side to side, to evenly distribute the grain within the interior of the feed lot. In this manner, feed may be introduced into the interior of the feed lot without necessitating the dangerous entry of any personnel into the feed lot.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved feed spreader, comprising:
a hollow housing;
a generally cylindrical portion of said housing having side air inlet openings;
support strut means extending across said side air inlet openings;
a rotary impeller having a plurality of radially extending vanes;
means on said support strut means mounting said impeller for rotation in said cylindrical housing portion;
a first pulley keyed for rotation with said impeller;
a motor mounted adjacent said cylindrical housing portion;
a second pulley secured to a rotary output shaft of said motor;
an endless belt around said first and second pulleys;
a feed intake tube extending through a cylindrical side wall of said cylindrical housing portion;
an elongated hollow rectangular discharge spout connected to said cylindrical housing portion;
an inclined planar transition wall connecting a top wall of said discharge spout with the cylindrical side wall of said cylindrical housing portion;
an adjustable elevation plate mounting said motor and said housing;
a horizontally extending support plate;
hinge means pivotally securing said elevation plate to said support plate for movement about a horizontal axis;
an elongated strip having a series of spaced apertures pivotally connected to said elevation plate;
an aperture in said support plate adapted to receive a pin through one of said strip apertures for locking said elevation plate in an adjusted position;
a vertically extending collar secured to a central bottom surface of said support plate;
said collar having a downwardly opening cylindrical recess;
a thrust bearing on a top wall of said recess;
a rotary bearing around the cylindrical side wall of said recess;
a cylindrical axle mounted by said bearings for relative rotation in said recess;
a mounting adaptor attached to said axle;
said adaptor having a hollow portion configured for receipt over a fence post;
a first set screw extending transversely through a side wall of said adaptor for engagement with a fence post;
a handle secured to said collar for rotating said collar about said axis; and
a second set screw extending through a side wall of said collar for selective engagement with said axle.

2. A new and improved feed spreader, comprising:
housing means;
impeller means;
means rotatably mounting said impeller means in said housing means;
feed inlet means in said housing adjacent said impeller means;
air inlet means in said housing adjacent said impeller means;
means operatively connected for rotating said impeller means;
elongated discharge spout means on said housing means;
mounting bracket means mounting said housing means for rotation about a vertical and horizontal axis;
an elevation plate secured to said housing means;
a support plate secured by hinge means to said elevation plate;
mounting adaptor means on said support plate for securement to a fence post;
means to rotate said support plate about a vertical axis with respect to said mounting adaptor; and
means to secure said elevation plate in an adjusted position.

3. The feed spreader of claim 2, wherein said means for securing said elevation plate in adjusted position comprises an elongated apertured strip pivotally secured to said elevation plate; and
an aperture in said support plate for receiving a pin extending through said apertured strip.

4. The feed spreader of claim 3, wherein said means for mounting said support plate for rotation about a vertical axis with respect to said mounting adaptor comprises a cylindrical axle secured to said mounting adaptor and a collar received over said axle secured to said support plate.

* * * * *